United States Patent [19]

Fenn

[11] 4,327,435
[45] Apr. 27, 1982

[54] PLAYBACK SYSTEM FOR RECORDING DISK HAVING FLEXIBLE, DEFORMABLE RECORDING MEMBRANE

[76] Inventor: George S. Fenn, Box 8, Henderer Rd., Elkton, Oreg. 97436

[21] Appl. No.: 117,638

[22] Filed: Feb. 1, 1980

[51] Int. Cl.³ .............................................. G11B 25/00
[52] U.S. Cl. .................................................. 369/261
[58] Field of Search .............. 369/264, 271, 272, 280, 369/287, 270, 261, 44, 45; 360/99

[56] References Cited

U.S. PATENT DOCUMENTS

| | | | |
|---|---|---|---|
| 3,369,227 | 2/1968 | Boissevain | 360/99 |
| 4,114,183 | 9/1978 | Ganske et al. | 360/99 |
| 4,208,683 | 6/1980 | Kleczkowski | 360/99 |

*Primary Examiner*—Charles E. Phillips
*Attorney, Agent, or Firm*—Ellsworth R. Roston; Charles H. Schwartz

[57] ABSTRACT

Apparatus for playing out information recorded on a side of a wafer-like rotary data-storage element, which element is deformable into a non-planar body of revolution. The apparatus includes a turntable for receiving and rotating such an element, and, according to the particular embodiment, either a positive or a negative pressurizing system for effecting element deformation on the turntable. Also included is a reading head mounted for tracking along a radial path which parallels the recorded side of an element deformed on the turntable.

10 Claims, 4 Drawing Figures

U.S. Patent     Apr. 27, 1982     4,327,435
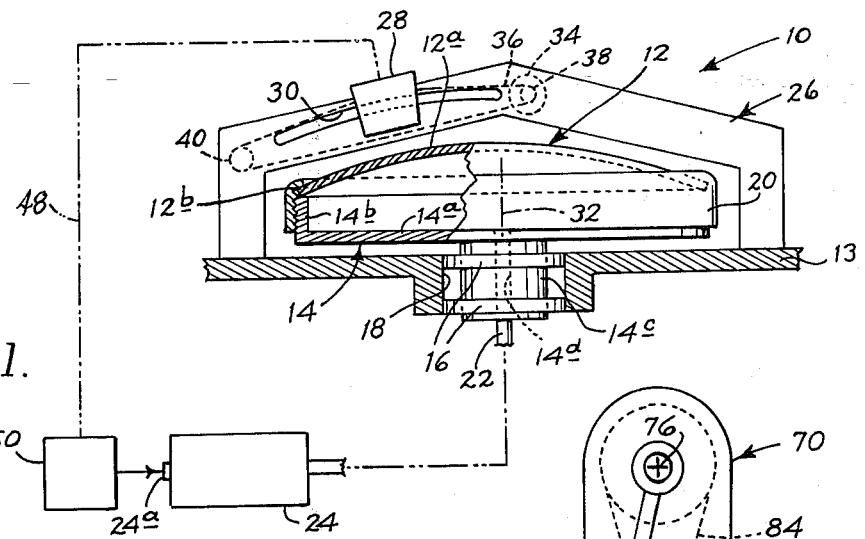
Fig. 1.
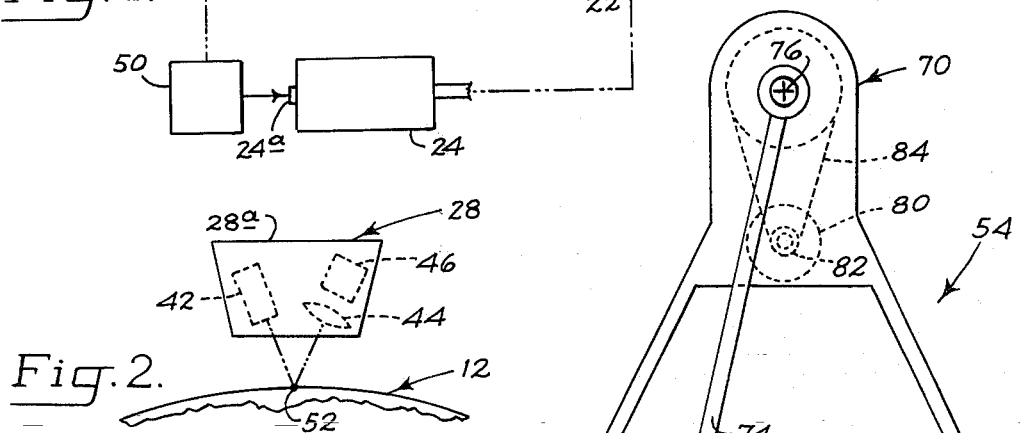
Fig. 2.
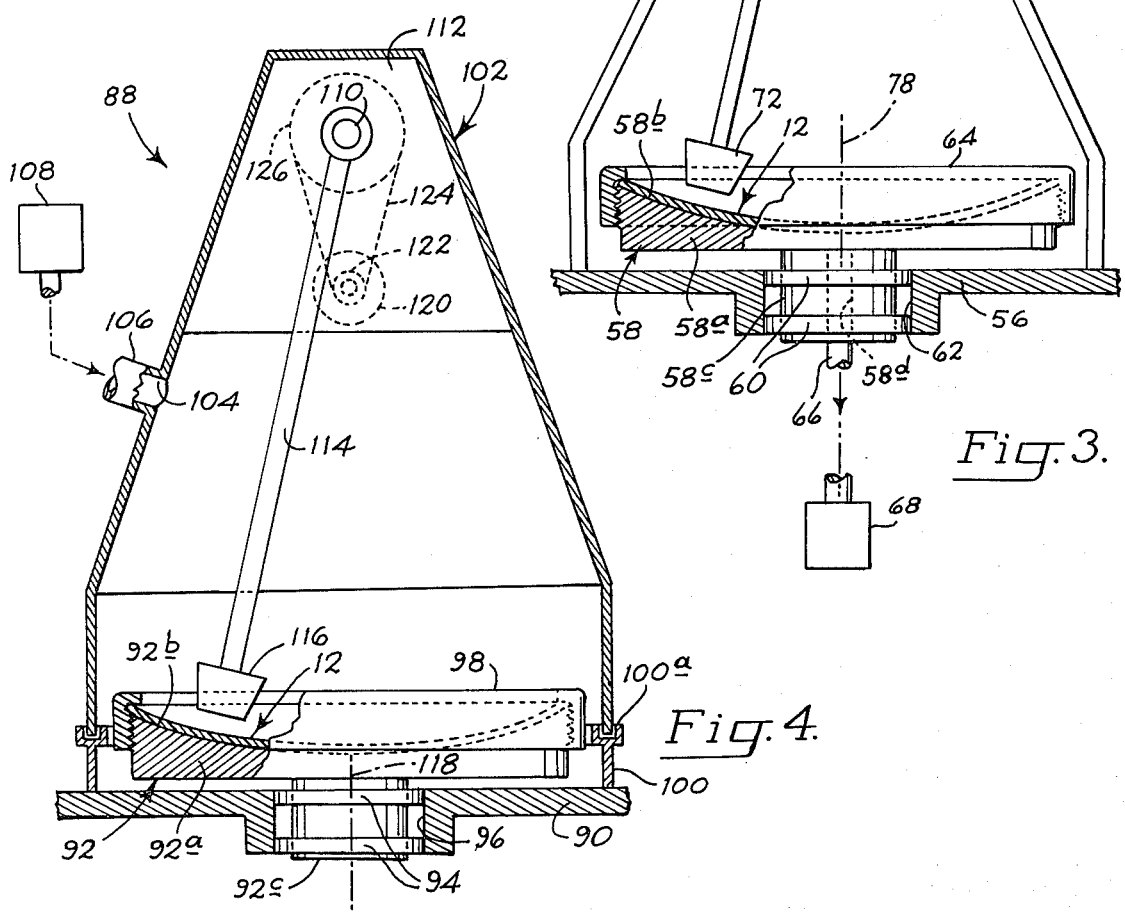
Fig. 3.
Fig. 4.

PLAYBACK SYSTEM FOR RECORDING DISK HAVING FLEXIBLE, DEFORMABLE RECORDING MEMBRANE

BACKGROUND AND SUMMARY OF THE INVENTION

This invention pertains to apparatus for playing out information recorded on a side of a wafer-like rotary recording disk. More particularly, it pertains to such apparatus which is especially designed to handle recording disks of the type which, for dimensional stability purposes, can be deformed selectively into non-planar bodies of revolution.

As an alternative to conventional planar or flat recording disks, I have recently proposed a recording disk construction wherein the disk has a pliable or stretchable central web which is deformable into a non-planar body of revolution, such as a segment of a thin-walled sphere. Such a disk, when rotated during a playback operation, exhibits an extremely high degree of configurational stability, and thus obviates problems of wobble, vibration and flutter that characterize the performance of flat recording disks.

While it is not necessary to an understanding of the present invention to know all of the constructional nuances of such a disk, reference is made to my prior-filed copending patent application, entitled "Rotary Self-Stabilizing Data-Storage Element", mailed for filing on Nov. 30, 1979, for a further understanding of the above-mentioned recording disk proposal.

Dynamic handling of a non-planar recording disk, of the type set forth above, obviously calls for unique considerations in the kind of apparatus provided for supporting it, rotating it, deforming it, and reading information from it.

A general object of the present invention is to provide apparatus which is especially suited for handling deformable recording disks of the type outlined above.

More specifically, an object of the invention is to provide such apparatus which includes mechanism for supporting and rotating a disk, while at the same time deforming it into the desired non-planar body of revolution.

Still another object of the invention is to provide apparatus of the type just outlined which further includes a specially mounted reading head which is adapted for radial tracking over the recorded surface of such a disk along a path which parallels the deformed recorded surface.

With respect to a recording disk of the type suggested, it is possible to record information on either or both sides thereof, and in a number of different formats—for example, magnetic, optical, and capacitive. Thus a still further object of the invention is to provide apparatus of the type just mentioned which is capable of playing out information from either side of such a disk, and in the appropriate format for recorded information carried on the disk.

These and other objects and advantages which are attained by the invention will become more fully apparent as the description which now follows is read in conjunction with the accompanying drawings.

DESCRIPTION OF THE DRAWINGS

FIG. 1 is a fragmentary side view, partially in cross section, illustrating one embodiment of playback apparatus constructed in accordance with the present invention.

FIG. 2 is a fragmentary and simplified schematic view showing the operation of a reading head employed in the apparatus of FIG. 1.

FIG. 3 is a fragmentary view, partially in cross section, and on about the same scale as FIG. 1, showing another modification of apparatus constructed in accordance with the invention.

FIG. 4, which is on about the same scale as FIGS. 1 and 3, shows still a further modification of apparatus constructed according to the invention.

DETAILED DESCRIPTION OF THE INVENTION

Turning now to the drawings, and referring first to FIG. 1, indicated generally at 10 is one form of apparatus as contemplated herein for playing back, or playing out, information recorded on a side in a wafer-like recording disk which is deformable into a non-planar body of revolution. Such a disk, placed in operative position in apparatus 10, and so deformed, is indicated generally at 12. Disk 12 is circular, and has a diameter of about 30-centimeters. It is formed with a central web 12a having a thickness of about 2-millimeters, and a circumferential rim 12b having a thickness of about 4-millimeters. By means which will be explained shortly, disk 12, in its deformed state as shown in FIG. 1, takes the form of a segment of a thin-walled sphere, and has a dome height (its overall vertical dimension in FIG. 1) of about 3-centimeters.

Both sides of disk 12 herein carry information, and in particular, optically encoded information which has been prepared in the surfaces of web 12a as by pressing from a master wherein data has been stored by laser contouring.

Included in apparatus 10 is a frame including a substantially horizontal frame plate 13 upon which is mounted a mandrel, or turntable, 14. Turntable 14 includes a flat circular base 14a, an upwardly extending circumferential rim 14b, and a central shaft 14c. Shaft 14c is supported through bearings 16 in a mounting opening 18 provided in plate 13.

The outer cylindrical surface of rim 14b is threaded to receive an annular cap 20 whose purpose will be explained shortly.

Extending through base 14a and shaft 14c is a central axial passage 14d which, in FIG. 1 connects through a pneumatic conduit 22 with the output side of a positive pressurizing system 24. System 24 is a conventional one whose output level is adjustable through application of a DC electrical control signal at a control input terminal 24a.

Suitably mounted on frame plate 13, and extending in a spaced fashion generally diametrically over the turntable, is a structure 26, also referred to herein as a mounting means, which supports an optical reading head 28 for reversible movement radially over the turntable. Head 28, the inner workings of which will be described shortly, is guided for movement through follower-type engagement with an arcuate slot 30 which is formed in structure 26, and which has a curvature matching, in parallel fashion, the deformed curvature of the upper surface in a pressure-deformed recording disk, such as disk 12. The arcuate path defined by slot 30 lies in a substantially vertical plane which parallels a vertical plane containing the axis of rotation of the turntable—such axis being shown at 32. Head 28 is positioned relative to structure 26 whereby, as it moves back and forth along the path defined by slot 30, it travels in the latter-mentioned plane.

Head 28 is moved back and forth along slot 30 under the influence of a DC motor 34, which is suitably mounted on structure 28, and a drive tape 36. Tape 36 has one end suitably anchored to the right side of head 28 in FIG. 1, and its other end anchored to the left side of the head in the figure. Between its ends, the tape extends over a drive pulley 38 and an idler 40.

Turning attention to FIG. 2, included in head 28, within a housing 28a, are a conventional low-power laser 42, a light-gathering lensing system 44, and a photodetector 46 which is sensitive to light at the same wavelength characterizing laser 42.

A fragment of the outer surface of recording disk 12 is shown also in FIG. 2.

With disk 12 deformed as shown, laser 42 directs light at a defined angle, and with a defined beam diameter, onto the upper surface of the disk which is rotated beneath the head as the head tracks radially over the disk. Impingement of the laser beam with the optical contour of surface 12a causes light to be reflected in a manner "reading" the information contained on the disk. Photodetector 46 responds to reflected light and produces a related electrical output signal.

Circuitry which coordinates the speed of rotation of turntable 14 and the speed of operation of motor 34 is conventional and well known in the art. Such circuitry is provided in apparatus 10, but is not illustrated inasmuch as it forms no part of the present invention.

Completing a description of what is shown in FIG. 1, and referring also again to FIG. 2, electrical output signals produced by photodetector 46 are suitably coupled through conductors, represented by dash-double-dot line 48, to the input of a conventional interpreter circuit 50 which monitors these signals to determine the proximity of reading head 28 to the point of laser-beam impingement with an underlying recording disk. Such a point of impingement is shown at 52 in FIG. 2. Circuit 50 is connected to control input terminal 24a, and supplies thereto, in a manner which will shortly be described, a DC control voltage whose level is proportional to the determined distance between the reading head and the laser-beam impingement point.

Explaining now how the apparatus so far described performs, and with reference to disk 12, the same is placed with its circumferential rim 12b lying on top of turntable rim 14b. Cap 20 is screwed onto the turntable to retain the disk. What results from such disk placement, in the region of rims 12b, 14b and cap 20, is what might be referred to as a pneumatic-leak seal between the disk and the turntable.

Pressurizing system 24 is energized, whereupon pneumatic pressure in the chamber now defined between the turntable and the disk rises and causes the disk to deform. With reading head 28 and interpreter circuit 50 active, circuit 50, through monitoring the output signal produced by photodetector 46, supplies a DC control voltage to terminal 24a which adjusts the output of system 24 to produce a spherical deformation of web 12a whose curvature substantially exactly matches the arcuate travel path defined for head 28 by slot 30.

With the disk properly deformed, the turntable is rotated at a substantially constant speed, and head 28 is moved at the proper speed over the disk, generally from the left end toward the right end of track 30 in FIG. 1. As has already been mentioned, conventional circuitry in apparatus 10 functions to insure an appropriate tracking speed for head 28 vis-a-vis rotational speed for turntable 14. Throughout a playback operation, circuit 50 continuously monitors output signals produced by photodetector 46 to produce any necessary adjustments (via DC control voltages) in the output of system 24 to maintain the disk properly deformed.

When playback has been completed, system 24 is shut down, head 28 is returned along track 30, and the disk is removed from the apparatus.

Turning attention now to FIG. 3, a modified form of playback apparatus constructed in accordance with the invention is indicated generally at 54. Apparatus 54 includes a frame having a substantially horizontal frame plate 56 upon which is mounted a mandrel, or turntable, 58. Turntable 58 includes a circular base portion 58a having an upwardly facing, substantially spherical concave face 58b. Joined centrally to the underside of base 58a is a central shaft 58c which is supported through bearings 60 in a mounting opening 62 provided in plate 56.

The outer cylindrical surface of base 58a is threaded to receive an annular cap 64 which functions in the same manner as previously mentioned cap 20.

Extending through base 58a and shaft 58c is a central axial passage 58d which connects through a pneumatic conduit, shown fragmentarily at 66, with the intake side of a negative (vacuum) pressurizing system represented in block form at 68. System 68 is entirely conventional in construction.

Suitably mounted on frame plate 56, and extending generally diametrically over the turntable as shown, is a structure, or mounting means, 70 which supports, as will be explained, an optical reading head 72 for reversible movement radially over the turntable. Head 72 is like previously described head 28. In particular, structure 70, through downwardly extending arm 74, mounts head 72 for swinging about an axis shown at 76. Axis 76 is normal to the plane of FIG. 3, and extends through the radial center point of face 58b. Arm 74 and head 72 are so positioned that, with swinging of the arm, the head travels in a vertical plane which contains the axis of rotation, shown at 78, for turntable 58.

Swinging of head 72 takes place under the influence of a DC motor 80 which is mounted on structure 70, and which carries a drive pulley 82 through which swinging of arm 74 occurs under the influence of a drive tape 84. Tape 84 is also trained over an idler 86 which is suitably connected to the upper end of arm 74 through the pivot connection provided for the arm.

Explaining how apparatus 54 performs, a disk, which again is designated as disk 12, is seated on the upper circumferential rim of turntable base 58a, and cap 64 is screwed in place to retain the disk. System 68 is operated to create a vacuum in the space between disk 12 and face 58b, whereupon the disk is deformed downwardly into spherical abutment with such a face, as shown in FIG. 3. The disk is rotated by the turntable, and motor 80 causes radial inward swinging of head 72 in a manner appropriate to read out information carried on the upwardly concave side of the disk.

On completion of a playback operation, system 68 is deenergized, head 72 is returned toward a position over the perimeter of turntable 58, and the disk is removed from the turntable. If the disk has information recorded on its opposite side which is to be read, it is simply turned over, and the operation just described repeated.

Directing attention now to FIG. 4 in the drawings, here there is shown generally at 88 a modification of playback apparatus, constructed according to the invention, which is similar in many respects to the apparatus shown in FIG. 3, except that it employs a positive pressurizing system to deform a recording disk. Apparatus 88 includes a frame having a substantially horizontal frame plate 90 which rotatably supports a mandrel, or turntable, 92. Turntable 92 includes a circular base portion 92a having an upwardly facing, concave spherical face 92b. Joined to and extending downwardly from the underside of base 92a is a central shaft 92c. The turntable is supported on plate 90 through bearings 94 which supports shaft 92c in a mounting opening 96 provided in plate 90.

The outside circumference of turntable 92 is threaded to receive an annular cap 98 which performs in the same manner described previously for caps 20, 64.

Suitably joined to the top surface of plate 90 in FIG. 4, and substantially symmetrically surrounding turntable 92, is an upwardly extending rim 100 whose upper circumferential portion in the figure takes the form of an upwardly facing, open, annular trough 100a.

Shown in operative position in FIG. 4, and extending over and about the turntable, is a generally conical, inverted hood 102 whose lower circumferential margin is sized to seat within trough 100a. Provided in hood 102 is a port 104 which communicates through a pneumatic conduit 106 with a conventional positive pressurizing system 108.

Pivotally mounted at 110 on a bracket 112, which is carried adjacent the upper end of hood 102 in FIG. 4, is a downwardly extending arm 114, the lower end of which carries an optical reading head 116 which is constructed like previously mentioned reading heads 28, 72. The pivot connection provided by pivot connection 110 is substantially normal to the plane of FIG. 4, and extends through the radial center point for spherical face 92b. Arm 114 and head 116 are so positioned that, with swinging of the arm, the head travels in a vertical plane, radially over the turntable, with such plane containing the axis (shown at 118) of rotation provided for the turntable.

Arm 114 and head 116 are swung reversibly over the turntable under the influence of a DC motor 120, a drive pulley 122, a drive tape 124 and an idler 126 which are similar to the corresponding structure found in the apparatus of FIG. 3.

Explaining the operation of apparatus 88, a disk, here also represented at 12, which is to be played out, is placed on the upper circumferential rim of turntable 92, and is retained by attachment of cap 98 to the turntable. System 108 is energized, with hood 102 in the position shown for it in FIG. 4, to pressurize the chamber defined within the hood so as to deform the central web in the disk downwardly into spherical contact with surface 92b.

With the disk so deformed, reading of information therefrom takes place in much the same manner described in connection with the apparatus shown in FIG. 3.

When a playback operation is complete, the reading head is returned to a position somewhat over the circumferential rim of the turntable, system 108 is de-energized, and hood 102 is removed, as is also the disk.

There have thus been proposed several modifications of playback apparatus uniquely suited for handling deformable recording disks of the type outlined. Both positive and negative pressurizing systems have been disclosed for achieving disk deformation. In one instance, proper disk deformation is maintained under what might best be described as a servo-control technique. In the other instances, proper deformation is defined by a preshaped turntable face intended to abut a disk. While, in the latter instances, abutment faces have been described herein as being spherical, other surfaces of revolution, symmetric with respect to the turntable's axis of revolution, may as well be used.

While "radial" tracking has been discussed, "substantial" radial tracking, like that found in a conventional phonograph player, could be used.

Thus, while several embodiments of the invention have been described with particularity, it is appreciated that various changes and modifications may be made without departing from the spirit of the invention.

It is claimed and desired to secure by Letters Patent:

1. Apparatus for reading information recorded on a particular side of a wafer-like rotary data-storage element, which element is axially deformable into a particular non-planar body of revolution, said apparatus including
 a frame member,
 a turntable rotatably mounted on said frame member and including a particular surface defining the particular body of revolution and constructed to receive the element,
 deforming means located adjacent said turntable and operable, with the element received on said particular surface, produces a force to deform the element into the particular non-planar body of revolution with the recorded side of the element displaced from the particular surface of the turntable,
 a head constructed for reading information recorded on the particular side of the element,
 means responsive to signals produced by the head for controlling the force produced by the deforming means on the wafer-like element to maintain the element in the particular non-planar body of revolution, and
 means mounting said head on said frame member for movement radially relative to the rotational axis of said turntable a substantially constant distance from the recorded side of the element.

2. The apparatus of claim 1, wherein said deforming means comprises a positive pressurizing system cooperating with said turntable to produce a positive force on the element to dispose the element against the particular surface of the turntable.

3. The apparatus of claim 1, wherein said deforming means cooperates with the turntable to deform the element into disposition against the particular surface of the turntable.

4. The apparatus of claim 3, wherein said deforming means comprises a positive pressurizing system cooperating with said turntable to produce a deflection of the element against said particular surface of the turntable.

5. The apparatus of claim 3, wherein said deforming means comprises a negative pressurizing system cooperating with said turntable to produce a deflection of the element against said particular surface of the turntable.

6. Apparatus for reading information recorded on a particular side of a wafer-like rotary data-storage element, which element is axially deformable into a particular non-planar body of revolution, including
 a frame member, a turntable rotatably mounted on said frame member and constructed to receive the element and having a particular surface defining the particular non-planar body of revolution, means associated with the turntable for applying a fluid force against the element on the turntable to dispose the element against the particular surface, a head constructed to read the information recorded on the particular side of the element, means operatively coupled to the head for moving the head in a radial path along the turntable in substantially fixed displacement from the recorded side of the element, and means responsive to the signals produced by the head for controlling the fluid force applied against the element to maintain the head in substantially the fixed relationship from the recorded side of the element.

7. Apparatus as set forth in claim 6 wherein the means providing the fluid force against the element operates to produce a vacuum on the element to dispose the element against the particular surface of the turntable.

8. Apparatus as set forth in claim 6 wherein the means providing the fluid force against the element operates to produce a positive pressure on the element to dispose the element against the particular surface of the turntable.

9. Apparatus as set forth in claim 6 wherein the moving means for the head includes means constructed to receive the head and to guide the head in the radial path along the turntable in the substantially fixed displacement from the recorded side of the element and the moving means further includes a motor for moving the head in the radial path along the guide means.

10. Apparatus as set forth in claim 6 wherein the moving means includes a member pivotable at a position displaced from the recorded side of the element and the member is disposed at one end near the particular surface of the turntable and the head is disposed on the end of the member near the particular surface of the turntable and the moving means includes a motor for pivoting the member.

* * * * *